UNITED STATES PATENT OFFICE.

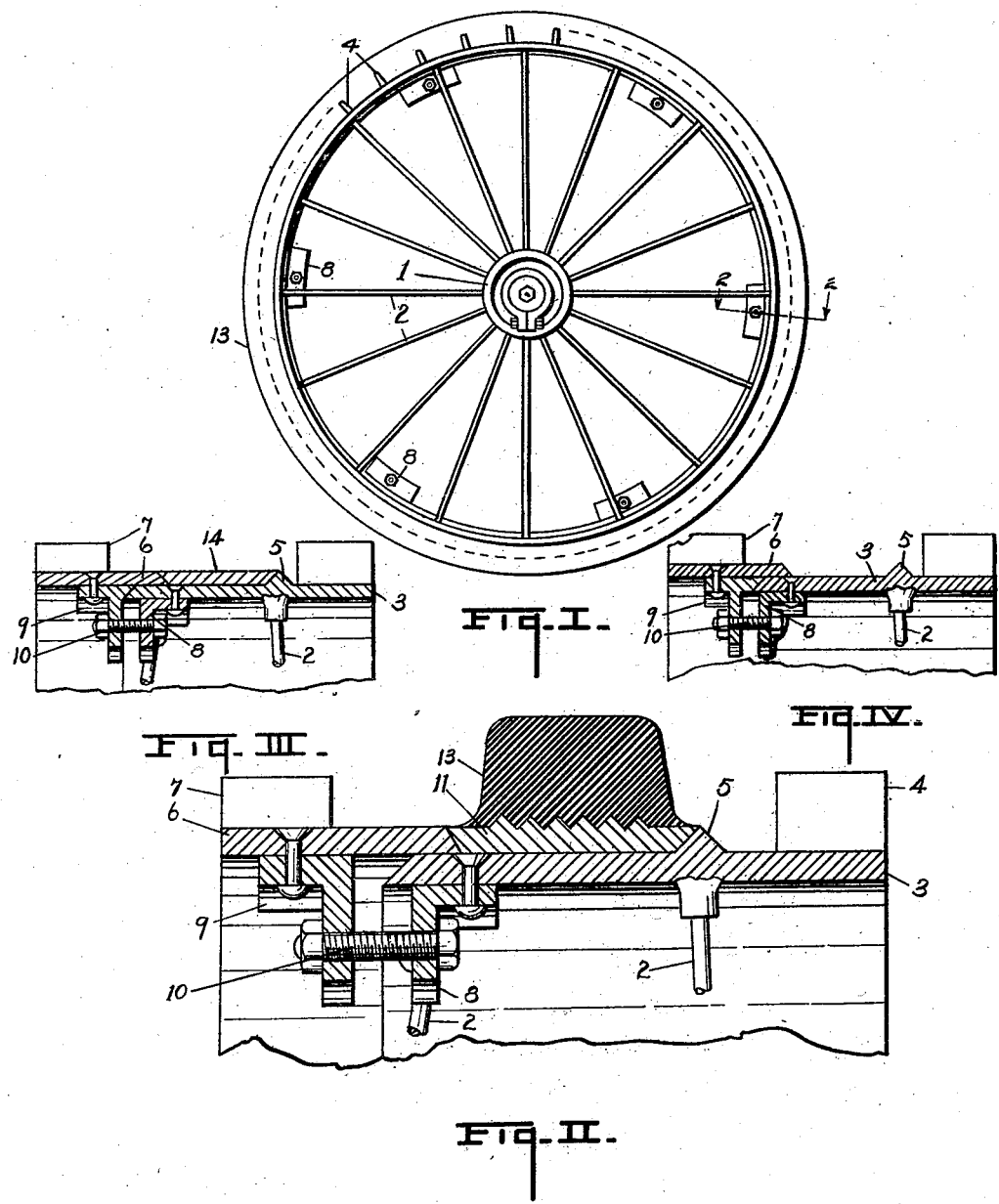

EDMUND E. HANS, OF DETROIT, MICHIGAN.

TRACTION WHEEL.

1,407,153. Specification of Letters Patent. Patented Feb. 21, 1922.

Application filed November 26, 1919. Serial No. 340,826.

*To all whom it may concern:*

Be it known that I, EDMUND E. HANS, a citizen of the United States, residing at the city of Detroit, county of Wayne, State of Michigan, have invented certain new and useful Improvements in Traction Wheels, of which the following is a specification.

This invention relates to improvements in traction wheels.

The main objects of this invention are:

First, to provide an improved traction wheel for tractors which is well adapted for farm or soft ground work and also road work.

Second, to provide an improved traction wheel having the advantages above mentioned which may be quickly changed or adapted to either use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a side view of my improved traction wheel.

Fig. II is a detail section through the rim on a line corresponding to line 2—2 of Fig. I.

Fig. III is a similar detail section with the resilient tire or tread removed, a plain intermediate rim member being substituted for the tread rim member of Fig. II.

Fig. IV is a detail section corresponding to that of Fig. III with the intermediate rim member omitted.

In the drawing similar reference characters refer to similar parts throughout the several views.

Referring to the drawing the hub 1 and the spokes 2 are shown conventionally as their details form no part of my present improvements. The spokes 2 are secured to the main rim member 3 which is provided with traction lugs 4 and a peripheral A-shaped rib 5.

The supplemental rim member 6 is adapted to telescope upon the main rim member 3 and is provided with traction lugs 7 of such length that their outer edges are in substantially the same planes as the other edges of the lugs 4.

The main rim member 3 is provided with coupling lugs 8 while the supplemental rim member 6 has coupling lugs 9 aligned therewith to receive the securing bolts 10.

The intermediate rim member 11 is clamped upon the main rim member between its rib 5 and the inner edge of the supplemental rim member 6. This rim member 11 carries the resilient tire or tread 13 which projects outwardly a substantial distance beyond the traction lugs so that when this intermediate rim member is mounted on the rim, the wheel is supported by the resilient tread.

When it is desired not to use this resilient tread, the rim member 11 is removed and I preferably substitute a plain rim member 14 as shown in Fig. III although the wheel may be used satisfactorily without this as shown in Fig. IV.

My improved traction wheel is readily converted or adapted for use as a road vehicle where it is desired to keep the lugs 4 away from the road bed, as shown in Fig. II, or to travel on soft ground as in farm work or in road making or the like, as shown in Figs. III and IV, the same being highly satisfactory for use in either relation.

I have not attempted to illustrate or describe certain modifications and adaptations which I contemplate as I believe the disclosure made will enable those skilled in the art to which my invention relates to embody or adapt the same as may be desired.

Having thus described my invention, what I claim as new and desire to secure by Letters Patent, is:

1. In a traction wheel, the combination with a hub and spokes, of telescopingly associated main and supplemental rim members having traction lugs at their outer edges, the main rim member being mounted on the spokes and having a peripheral rib at the inner side of its said traction lugs, an intermediate rim member arranged on said main rim member between its said rib and the edge of said supplemental rim member, a resilient tread carried by said intermediate rim member and projecting outwardly beyond said traction lugs, coupling lugs on said main and supplemental rim members, and bolts disposed through said lugs to retain the supplemental member and clamp the intermediate rim member between it and said rib on the main rim member.

2. In a traction wheel, the combination with a hub and spokes, of telescopingly associated main and supplemental rim members having traction lugs at their outer edges, the main rim member being mounted on the spokes and having a peripheral rib at the inner side of its said traction lugs, an intermediate rim member arranged on said main rim member between its said rib and the edge of said supplemental rim member, coupling lugs on said main and supplemental rim members, and bolts disposed through said lugs to retain the supplemental member and clamp the intermediate rim member between it and said rib on the main rim member.

3. In a traction wheel, the combination with a hub and spokes, of telescopingly associated main and supplemental rim members provided with traction lugs, the main rim member being mounted on the spokes, an intermediate rim member removably mounted on said main rim member at the inner side of its lugs, a tread carried by said intermediate rim member and projecting outwardly beyond said traction lugs, and means for removably securing said supplemental and intermediate rim members.

4. In a traction wheel, the combination with a hub and spokes, of telescopingly associated main and supplemental rim members, the main rim member being mounted on the spokes, an intermediate rim member removably mounted on said main rim member at the inner side of its lugs, and means for removably securing said supplemental and intermediate rim members.

5. In a traction wheel, the combination with a hub and spokes, of main and supplemental rim members provided with traction lugs, the main rim member being mounted on the spokes, an intermediate rim member removably mounted on said main rim member and retained thereon by said supplemental rim member, a resilient tread carried by said intermediate rim member, and means for securing said supplemental rim member.

6. In a traction wheel, the combination with a hub and spokes, of main and supplemental rim members provided with traction lugs, the main rim member being mounted on the spokes, an intermediate rim member removably mounted on said main rim member and retained thereon by said supplemental rim member, and means for securing said supplemental rim member.

7. In a traction wheel, the combination with a hub and spokes, of a main rim member mounted on the spokes, an intermediate rim member removably mounted on said main rim member, a supplemental rim member mounted at the side of the intermediate rim member, a resilient tread carried by said intermediate rim member, means for securing said supplemental and intermediate rim members to the main rim member, and traction cleats fixed to the supplemental rim member.

In witness whereof, I have hereunto set my hand and seal.

EDMUND E. HANS. [L. S.]

Witnesses:
CARRIE C. SCHWARTZEL,
WALTER I. OESCHGER.